US009979553B2

(12) United States Patent
Kommireddy et al.

(10) Patent No.: US 9,979,553 B2
(45) Date of Patent: May 22, 2018

(54) SECURE CERTIFICATE DISTRIBUTION

(71) Applicant: AirWatch LLC, Atlanta, GA (US)

(72) Inventors: Sridhara Babu Kommireddy, Alpharetta, GA (US); Sagar Date, Atlanta, GA (US); Priti Marappan, Atlanta, GA (US); Charles David Berndt, Atlanta, GA (US)

(73) Assignee: AIRWATCH LLC, Atlanta, GA (US)

( * ) Notice: Subject to any disclaimer, the term of this patent is extended or adjusted under 35 U.S.C. 154(b) by 347 days.

(21) Appl. No.: 14/819,918

(22) Filed: Aug. 6, 2015

(65) Prior Publication Data
US 2017/0041151 A1    Feb. 9, 2017

(51) Int. Cl.
H04L 9/32 (2006.01)
H04L 9/00 (2006.01)

(52) U.S. Cl.
CPC ............ H04L 9/3268 (2013.01); H04L 9/006 (2013.01); H04L 9/321 (2013.01); H04L 9/3228 (2013.01); H04L 9/3263 (2013.01)

(58) Field of Classification Search
CPC ......... H04L 9/32; H04L 9/321; H04L 9/3228; H04L 9/3263; H04L 9/3268; H04L 9/0006
See application file for complete search history.

(56) References Cited

U.S. PATENT DOCUMENTS

| | | | | |
|---|---|---|---|---|
| 6,865,673 | B1* | 3/2005 | Nessett | H04L 41/28 380/247 |
| 8,370,428 | B1* | 2/2013 | Bayliss | H04W 4/001 455/411 |
| 9,173,101 | B1* | 10/2015 | Angelov | H04W 12/08 |
| 9,191,298 | B1* | 11/2015 | Bilby | H04L 41/046 |
| 2003/0074555 | A1 | 4/2003 | Fahn et al. | |
| 2006/0150241 | A1* | 7/2006 | Huh | H04L 9/32 726/4 |
| 2006/0242405 | A1* | 10/2006 | Gupta | H04L 63/0823 713/156 |
| 2008/0016336 | A1* | 1/2008 | Stirbu | H04L 63/0823 713/156 |

(Continued)

FOREIGN PATENT DOCUMENTS

| | | | |
|---|---|---|---|
| EP | 869637 | 10/1998 | |
| WO | WO2014154660 A1 * | 10/2014 | ............ H04L 29/06 |

OTHER PUBLICATIONS

International Search Report dated Nov. 7, 2016 for Application No. PCT/US2016/045649.

Primary Examiner — Hadi S Armouche
Assistant Examiner — Alexander R Lapian
(74) Attorney, Agent, or Firm — Thomas Horstemeyer, LLP

(57) ABSTRACT

Disclosed are various examples of securely distributing certificates to client devices. A uniform resource locator (URL) is sent to a client device, wherein the URL represents an address from which the client device can request a user certificate. A certificate for a registration authority is sent to the client device, wherein the certificate comprises a first public key and a first private key. A certificate signing request (CSR) received from the client device at the URL is decrypted, wherein the CSR is encrypted with the first public key. The CSR is validated based at least in part on the URL sent to the client device. The user certificate is then sent to the client device.

20 Claims, 4 Drawing Sheets

(56) References Cited

U.S. PATENT DOCUMENTS

| | | | |
|---|---|---|---|
| 2008/0072039 A1* | 3/2008 | Relyea | H04L 9/3263 713/158 |
| 2008/0201575 A1* | 8/2008 | van der Rijn | H04L 9/321 713/156 |
| 2008/0304669 A1* | 12/2008 | Bugbee | H04L 9/0894 380/278 |
| 2012/0036364 A1* | 2/2012 | Yoneda | H04L 9/30 713/175 |
| 2012/0173873 A1* | 7/2012 | Bell | H04L 9/321 713/156 |
| 2013/0046973 A1* | 2/2013 | Resch | H04L 9/085 713/156 |
| 2013/0073856 A1* | 3/2013 | Sherkin | H04L 9/006 713/176 |
| 2013/0086377 A1* | 4/2013 | Cilfone | H04L 9/085 713/156 |
| 2013/0132721 A1* | 5/2013 | Busser | H04L 9/08 713/168 |
| 2016/0057141 A1* | 2/2016 | Van Den Broeck | H04L 9/3268 726/10 |
| 2016/0373431 A1* | 12/2016 | Van Den Broeck | H04L 63/0823 |

* cited by examiner

SECURE CERTIFICATE DISTRIBUTION

BACKGROUND

Historically, digital certificates were installed manually on client devices. This installation process often requires intensive input from network administrators. Accordingly, manual installation and management of certificates on client devices does not scale well for large organizations with numerous devices.

Several protocols exist to simplify and automate installation and management of certificates. These protocols, such as the simple certificate enrollment protocol (SCEP), allow network users to request their digital certificate electronically and automatically have it installed on their client device. However, these protocols suffer from a number of issues. For example, these protocols are not uniformly supported by all client devices, nor are these protocols supported by all certificate authorities. Moreover, a number of these protocols suffer from various security vulnerabilities.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various examples of a system for securely distributing certificates to client devices. The approaches described can be configured to work on any device capable of executing the various applications described herein. Moreover, these approaches allow for certificates that have been installed to be revoked, renewed, or otherwise managed. Further, these approaches allow for certificates to be requested and installed in a manner that prevents malicious third-parties from analyzing the network traffic between devices to covertly obtain unauthorized access to certificates through various replay attacks, escalation of privileges attacks, and other approaches.

Figure 1:
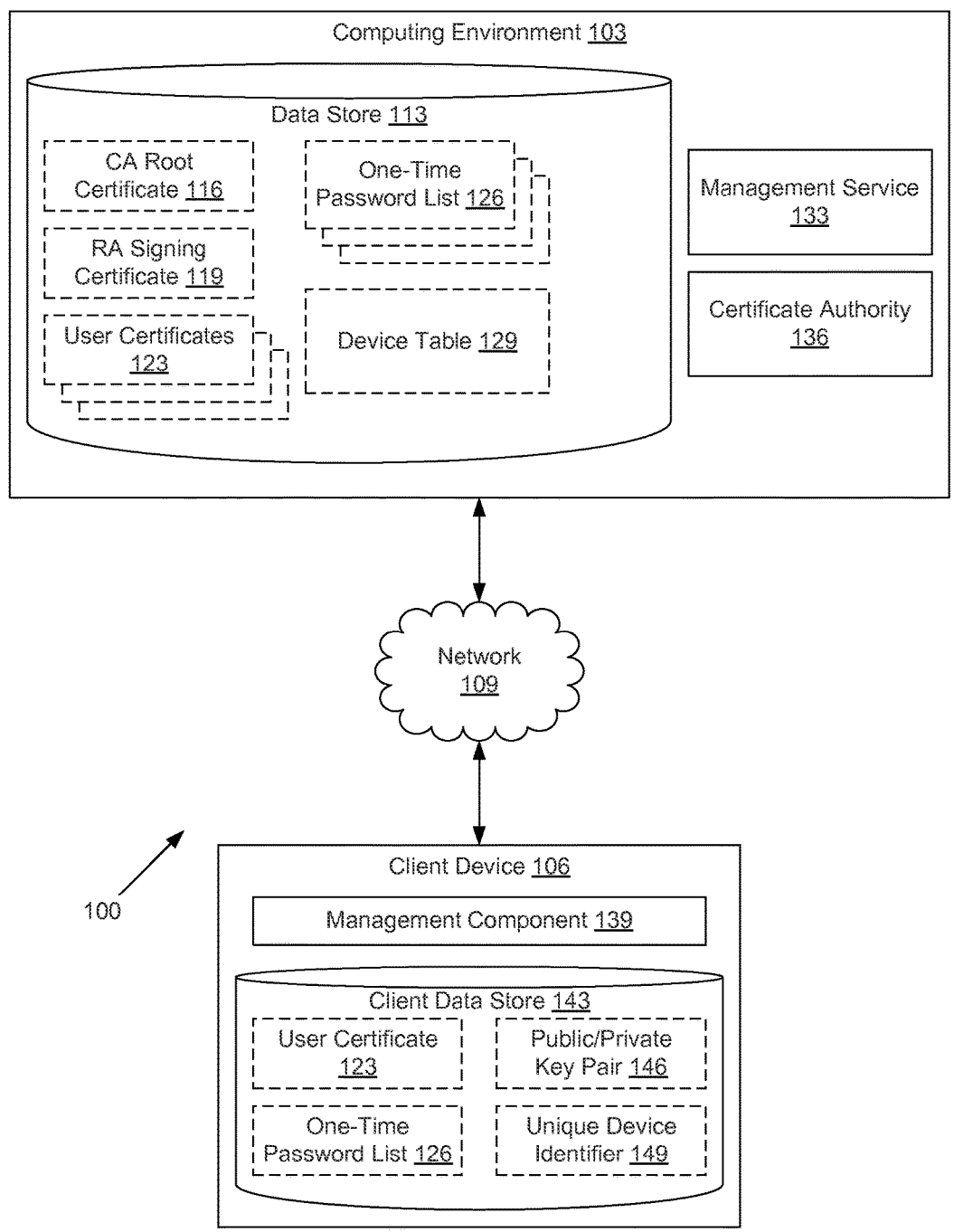
FIG. 1 is a schematic block diagram depicting a networked environment according to various examples of the present disclosure.

With reference to FIG. 1, shown is a networked environment 100 according to various embodiments. The networked environment 100 includes a computing environment 103 and a client device 106, which are in data communication with each other via a network 109. The network 109 includes, for example, the Internet, intranets, extranets, wide area networks (WANs), local area networks (LANs), wired networks, wireless networks, other suitable networks, or any combination of two or more such networks. For example, such networks can comprise satellite networks, cable networks, Ethernet networks, and other types of networks.

The computing environment 103 can include, for example, a server computer or any other system providing computing capability. Alternatively, the computing environment 103 can employ a plurality of computing devices that can be arranged, for example, in one or more server banks or computer banks or other arrangements. Such computing devices can be located in a single installation or can be distributed among many different geographical locations. For example, the computing environment 103 can include a plurality of computing devices that together can include a hosted computing resource, a grid computing resource, or any other distributed computing arrangement. In some cases, the computing environment 103 can correspond to an elastic or virtualized computing resource where the allotted capacity of processing, network, storage, or other computing-related resources can vary over time.

Various applications or other functionality can be executed in the computing environment 103 according to various embodiments. Also, various data is stored in one or more data stores 113 that are accessible to the computing environment 103. Each of the data stores 113 can represent one or more data stores. For example, a certificate authority root certificate 116, a registration authority certificate 119, one or more user certificates 123, one or more one-time password (OTP) lists 126, a device table 129, and potentially other data are stored in the data store 113. The components executed on the computing environment 103, for example, can include a management service 133, a certificate authority 136, and other applications, services, processes, systems, engines, or functionality not discussed in detail herein.

The management service 133 can manage and oversee the operation of one or more client devices 106. In one example, an employer can operate the management service 133 to ensure that the client devices 106 of its employees are operating in compliance with the security policies. In another example, an employer can configure the management service 133 to enforce different policies (or no policies at all) based upon which users or employees are currently logged into or otherwise operating the client device 106. The management service 133 can also facilitate access to email, calendar data, contact information, and other resources provided by the computing environment 103 or accessible on the client device 106. The management service 133 can also facilitate the transmission of user certificates 123 to client devices 106, as further described below.

The certificate authority 136 can generate or issue certificates, such as user certificates 123. The certificate authority 136 can also validate previously generated or issued user certificates 123. In some instances, the certificate authority 136 can be controlled by the same entity that controls the management service 133. In other instances, the certificate authority 136 can be controlled by a third party.

The certificate authority (CA) root certificate 116 can represent a public key infrastructure (PKI) certificate used by the certificate authority 136 for signing or otherwise validating user certificates 123 generated by the certificate authority 136. For example, when the certificate authority 136 generates a user certificate 123, the certificate authority can sign the user certificate 123 with a signing key specified in the CA root certificate 116. By comparing the identity of the signing key with the CA root certificate 116, one could validate or verify that the certificate authority 136 signed and, presumably, generated the user certificate 123.

The registration authority (RA) signing certificate 119 can represent a PKI certificate that specifies the public key used by client devices 106 to request a user certificate 123 from the certificate authority 136. Requests for user certificates 123 may be encrypted with the public key specified by the RA signing certificate 119. By encrypting a request for a user certificate 123 with the public key specified in the RA signing certificate 119, the client device 106 can safely assumed that the request is being sent to an authorized certificate authority 136.

A user certificate 123 can represent a certification that a public key of an asymmetric encryption key-pair belongs to or is owned by an entity identified in the user certificate 123. For example, a user certificate 123 can certify that a public key identified in the user certificate 123 belongs to the client device 106. As another example, a user certificate 123 can certify that a public key identified in the user certificate 123 belongs to a user associated with a user account. In instances where a user has multiple user accounts, such as different user accounts for different services, a user may have multiple user certificates 123. Similarly, where a user has multiple public keys, such as different public keys to be used for authentication with different services, a user may have multiple user certificates 123.

A one-time password list 126 can represent a list of one-time passwords used to authenticate the management component 139 executing on the client device 106 in communications with the management service 133. A one-time password is a password that is valid for only a single session or transaction. Because a one-time password is only used once, a one-time password is immune from replay attacks or other methods where an attacker attempts to decode a password and use it to gain unauthorized access to a system. Accordingly, a list of one-time passwords may be kept in the client data store 143 and the data store 113, which can assist the management service 133 in verifying any one-time passwords submitted by the client device 106.

In some instances, one-time passwords can be generated algorithmically when necessary. In these instances, a one-time password list 126 can be omitted or used to provide redundancy. For example, various time-synchronization algorithms may be used to generate a one-time password when required. Time-synchronization approaches can periodically (e.g. every 30-seconds or every minute) generate a new one-time password based on the current time. These approaches can require that the clock used by the management service 133 be kept synchronized with the clock of the client device 106. As another example, a mathematical algorithm can be used to generate a new one-time password based on the previously used one-time password. Such approaches can create a chain of one-time passwords, requiring that the one-time passwords be used in sequence.

The device table 129 can represent a mapping of client devices 106 to unique device identifiers 149. In some instances, the device table 129 can also include one-time password lists 126 or user certificates 123 mapped to a client device 106 or a unique device identifier 149. The device table 129 can, for example, include key-value pairs. Each key-value pair can include a unique device identifier 149 as the key and a corresponding client device 106, one-time password list 126, or user certificate 123 as a value. Queries of the device table 129 that use the unique device identifier 149 can return any user certificates 123 or one-time password lists 126 linked to the unique device identifier 149.

The client device 106 can be representative of a plurality of client devices that can be coupled to the network 109. The client device 106 can include, for example, a processor-based system such as a computer system. Such a computer system can be embodied in the form of a desktop computer, a laptop computer, personal digital assistants, cellular telephones, smartphones, set-top boxes, music players, web pads, tablet computer systems, game consoles, electronic book readers, or other devices with like capability. The client device 106 can include a display. The display can include, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 106 can execute various applications. These applications can, for example, be executed to access network content served up by the computing environment 103 or other servers, thereby rendering a user interface on the display. To this end, the various applications can include, for example, a browser or a dedicated application, and the user interface can include a network page, an application screen, or other user interface.

The client device 106 can also execute a management component 139. The management component can request that one or more user certificates 123 be sent to the client device 106 for installation on the client device 106. The management component 139 can control or limit access to various resources of the client device 106 by a current user of the client device 106 or the client application 139. The management component 139 can also limit access of the client device 106 to network content. The management component 139 can limit access based at least in part on one or more policies or other instructions supplied by the management service 133 to the management component 139.

The client device 106 can also contain a client data store 143, which can store data required for use by the management component 139 or by the client device 106 to perform other functions. The client data store 143 can include a user certificate 123, a one-time password list 126, a public/private key pair 146 for the client device 106, and a unique device identifier 149 assigned to the client device 106.

The public/private key pair 146 can represent a pair of encryption keys used with asymmetric encryption algorithms (e.g. the Rivest-Shamir-Aadleman algorithm or various Elliptic Curve Cryptography algorithms). The public/private key pair 146 can be used, for example, to secure communications between the management service 133 and the management component 139. In some instances, the public/private key pair 146 may be generated by the client device 106 as needed and temporarily stored in the client data store 143 until the public/private key pair 146 is no longer required. In other instances, the public/private key pair 146 can be permanently installed on the client device 106.

The unique device identifier 149 can represent a uniquely identifying binary number associated with the client device 106 that can distinguish the client device 106 from other client devices 106. The unique device identifier 149 can, for example, correspond to a 128-bit globally unique identifier (GUID) assigned to the client device 106, a media access control (MAC) address of a network card installed on the client device 106, an international mobile station equipment identity (IMEI) number, or another identifier. The unique device identifier 149 can be assigned to the client device 106 by the management service 133 or can be generated by the client device 106 itself.

Next, a general description of the operation of the various components of the networked environment 100 is provided. To begin, the management service 133 sends a message to the management component 139. The message can include a uniform resource locator (URL) to be used by the management component 139 for requesting one or more user certificates 123. The message can also include a unique device identifier 149 assigned to the client device 106.

The management component 139 can subsequently request that the management service 133 provide one or more user certificates 123. To request the user certificate 123, the management component 139 can send a request to the URL previously provided by the management service 133. The request can also include the unique device identifier 149 of the client device 106, if one were previously provided by the management service 133. In some instances, the request can also include a one-time password retrieved from the one-time password list 126 assigned to the client device 106. The user certificates 123 can already exist or the management component 139 can request that the management service 133 generate new user certificates 123 to be provided to the management component 139.

In response to receiving the request, the management service 133 can determine whether the request is authentic. First, the management service 133 can determine whether the request received from the management component 139 was received at the URL provided by the management service 133. If the request used a different URL (e.g. the URL http://www.example.com/certrequest/123456 instead of the URL http://www.example.com/abcdefg), then the management service 133 can determine that the request is invalid. Second, the management service 133 can determine whether the one-time password provided by the management component 139 as part of the request is correct. An incorrect one-time password could indicate that the request was intercepted and is being resent (i.e. a replay attack) by a third-party to gain unauthorized access to the requested user certificate 123. Third, the management service 133 can determine whether the unique device identifier 149 provided to the client device 106 matches the unique device identifier 149 included in the request. If the unique device identifier 149 provided by the management component 139 does not match the unique device identifier 149 currently linked to the client device 106, the request may be invalid.

If the request is valid, the management service 133 provides the requested user certificates 123 to the management component 139. The user certificates 123 may be encrypted with the public key of the public/private key pair 146 of the client device 106 in order to securely transmit the requested user certificates 123. The user certificates may also be signed with the RA signing certificate 119 in order for the management component 139 to verify that the user certificates 123 are genuine.

Figure 2:
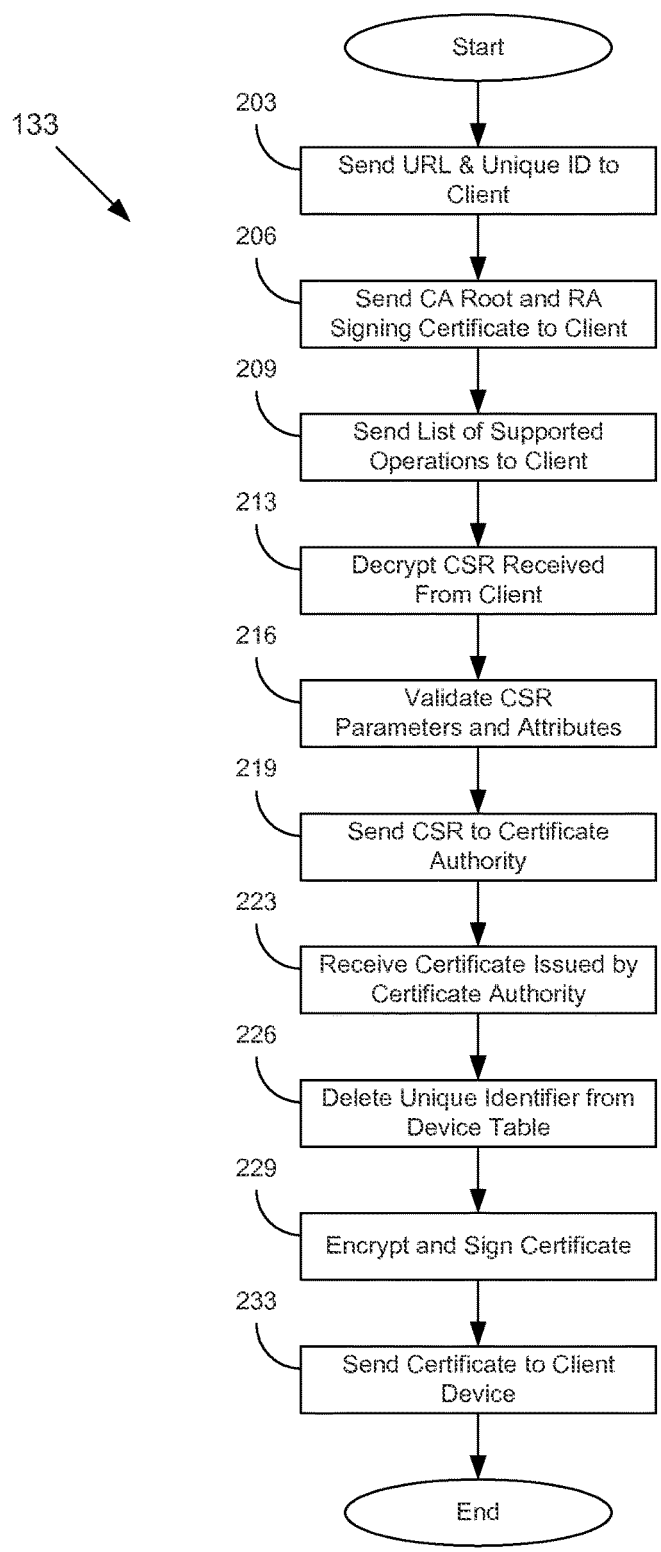
FIG. 2 is a flowchart illustrating one example of functionality according to various examples of the disclosure.

Referring next to FIG. 2, shown is a flowchart that provides one example of the operation of a portion of the management service 133. As an alternative, the flowchart of FIG. 2 can be viewed as depicting an example of elements of a method implemented in the computing environment 103.

Beginning with step 203, the management service 133 can send a URL and a unique device identifier 149 to the management component 139. The URL may specify an address at which the management component 139 can request one or more user certificates 123. The URL may also indicate additional fields where specific information, such as the unique device identifier 149, can be included in any request made by the management component 139.

Proceeding to step 206, the management service 133 can send the CA root certificate 116 and the RA signing certificate 119 to the client device. The certificates can be sent in response to a request from the management component 139 for the certificates. The certificates can, in some examples, be sent via an encrypted channel, such as a connection secured using the transport layer security (TLS) protocol.

Moving on to step 209, the management service 133 can send a list of operations supported by the certificate authority 136. The list of supported operations can include, for example, types of encryption algorithms (e.g. AES-128, AES-192, AES-256, TwoFish, 3DES, or other algorithms) and types of cryptographic hash algorithms (e.g. SHA-512, SHA-256, md5, or other algorithms).

Referring next to step 213, the management service 133 can decrypt a certificate signing request (CSR) received from the management component 139. The CSR can be encrypted by the management component 139 using the pubic key specified by the CA root certificate 116. The CSR can also be signed by the private key in the public/private key pair 146 of the client device 106.

Proceeding next to step 216, the management service 133 can validate the CSR. The management service 133 can, for example, determine whether the CSR was sent to the URL provided to the management component 139 previously at step 203. The management service 133 can also, for example, determine whether the unique device identifier 149 previously sent to the management component 139 was included with the CSR. If the CSR was sent to a different URL or was not accompanied by the unique device identifier 149, the management service 133 can determine that the CSR is invalid. In instances where the CSR included a one-time password for additional security, the management service 133 can query the device table 129 to determine if the one-time password is included in a one-time password list 126 linked to the unique device identifier 149. In addition, if the CSR was signed with a private other than the private key included in the public/private key pair 146 of the client device 106, the management service 133 can determine that the CSR is invalid.

Assuming that the CSR is determined to be valid, the process continues to step 219. Here, the management service 133 can send the CSR to the certificate authority 136 in order to retrieve the requested user certificates 123. Referring next to step 223, the management service 133 can receive the requested user certificates 123 from the certificate authority 136.

Proceeding next to step 226, the management service 133 can delete the unique device identifier 149 from the device table 129. This removes the link between the unique device identifier 149 and the client device 106 as well as any corresponding user certificates 123 or one-time password lists 126. By deleting the unique device identifier 149, replay attacks where a third-party intercepts and resends the CSR are neutralized because the resent CSR would contain a unique device identifier 149 that is no longer in use.

Moving on to step 229, the management service 133 can encrypt and sign the user certificate 123. The user certificate 123 can be encrypted with the public key of the public/private key pair 146 of the client device 106. The user certificate can also be signed with the signing key specified by the RA signing certificate 119.

Referring next to step 233, the management service 133 can send the encrypted and signed user certificate 123 to the management component 139. In some instances, the user certificate 123 can be sent over a secure channel, such as a connection secured with TLS. However, this is not required because the user certificate 123 was previously encrypted at step 229. Execution of the process subsequently ends.

Figure 3:
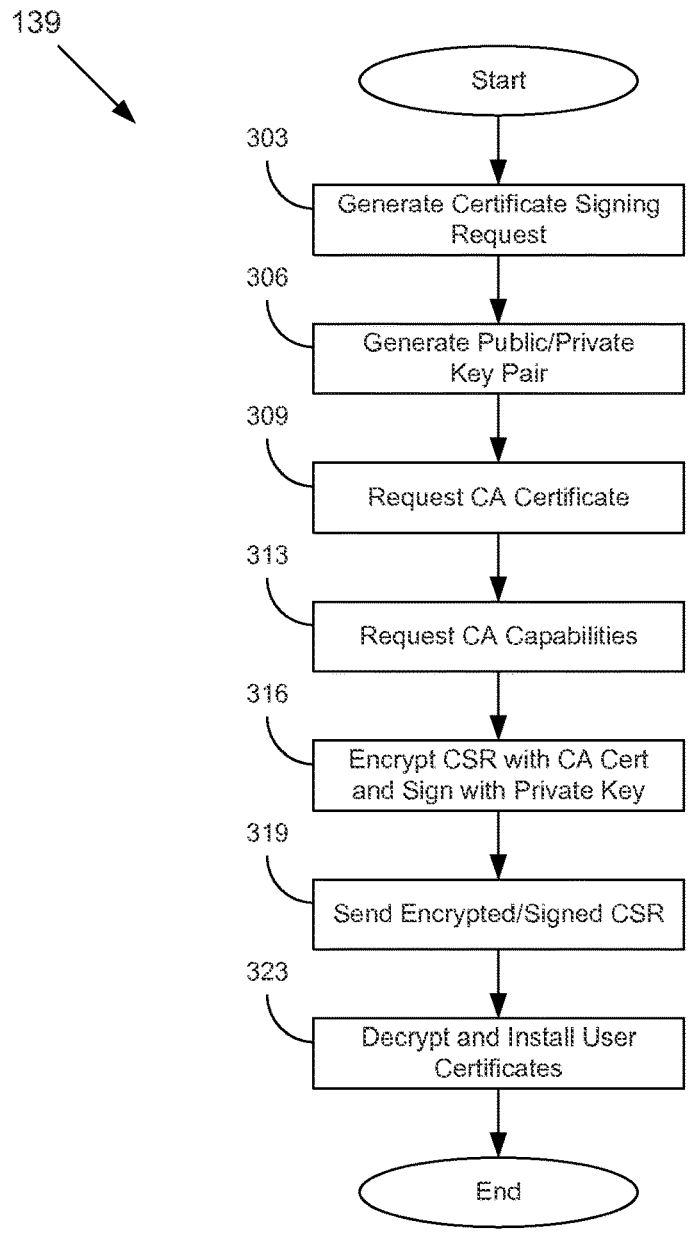
FIG. 3 is a flowchart illustrating one example of functionality according to various examples of the disclosure.

Referring next to FIG. 3, shown is a flowchart that provides one example of the operation of a portion of the management component 139. As an alternative, the flowchart of FIG. 3 can be viewed as depicting an example of elements of a method implemented in the computing environment 103.

Beginning with step 303, the management component 139 can generate a CSR. The CSR can include a one-time password selected from a one-time password list 126 and include a unique device identifier 149 previously provided by the management service 133. However, in some instances, the one-time password and the unique device identifier 149 may be provided separately from the CSR.

Proceeding to step 306, the management component 139 can generate a public/private key-pair 146. Generating a public/private key pair 146 specific for requesting a user certificate 123 can provide forward secrecy for similar transactions. Even if the public/private key pair 146 used to retrieve the user certificate 123 is compromised or discovered, separate requests for user certificates 123 remain secure because of their use of separate public/private key pairs 146. However, in some instances, the public/private key pair 146 may be preexisting and used for multiple transactions.

Moving on to step 309, the management component 139 can request the CA root certificate 116 and the RA signing certificate 119. The CA root certificate can be requested so that the CSR can be encrypted with the public key specified in the CA root certificate. The RA signing certificate 119 can be requested so that user certificates 123 received from the management service 133 can be verified.

Referring next to step 313, the management component 139 can request the capabilities of the CA authority 136. The capabilities can be requested so that the appropriate cryptographic algorithms are used when sending the CSR to the management service 133.

Proceeding to step 316, the management component 139 can encrypt the CSR with the public key specified in the CA root certificate 116 and sign the encrypted CSR with the private key in the public/private key pair 146 of the client device 106.

Moving on to step 319, the management component 139 can send the encrypted CSR to the management service 133. The CSR can be sent to the URL previously received from the management service 133. In some instances, the unique device identifier 149 assigned to the client device 106 or a one-time password selected from the one-time password list 126 on the client device 106 are included in the URL.

Referring next to step 323, the management component 139 can decrypt and install the user certificates 123 it receives from the management service 133. Execution of the process subsequently ends.

Figure 4:
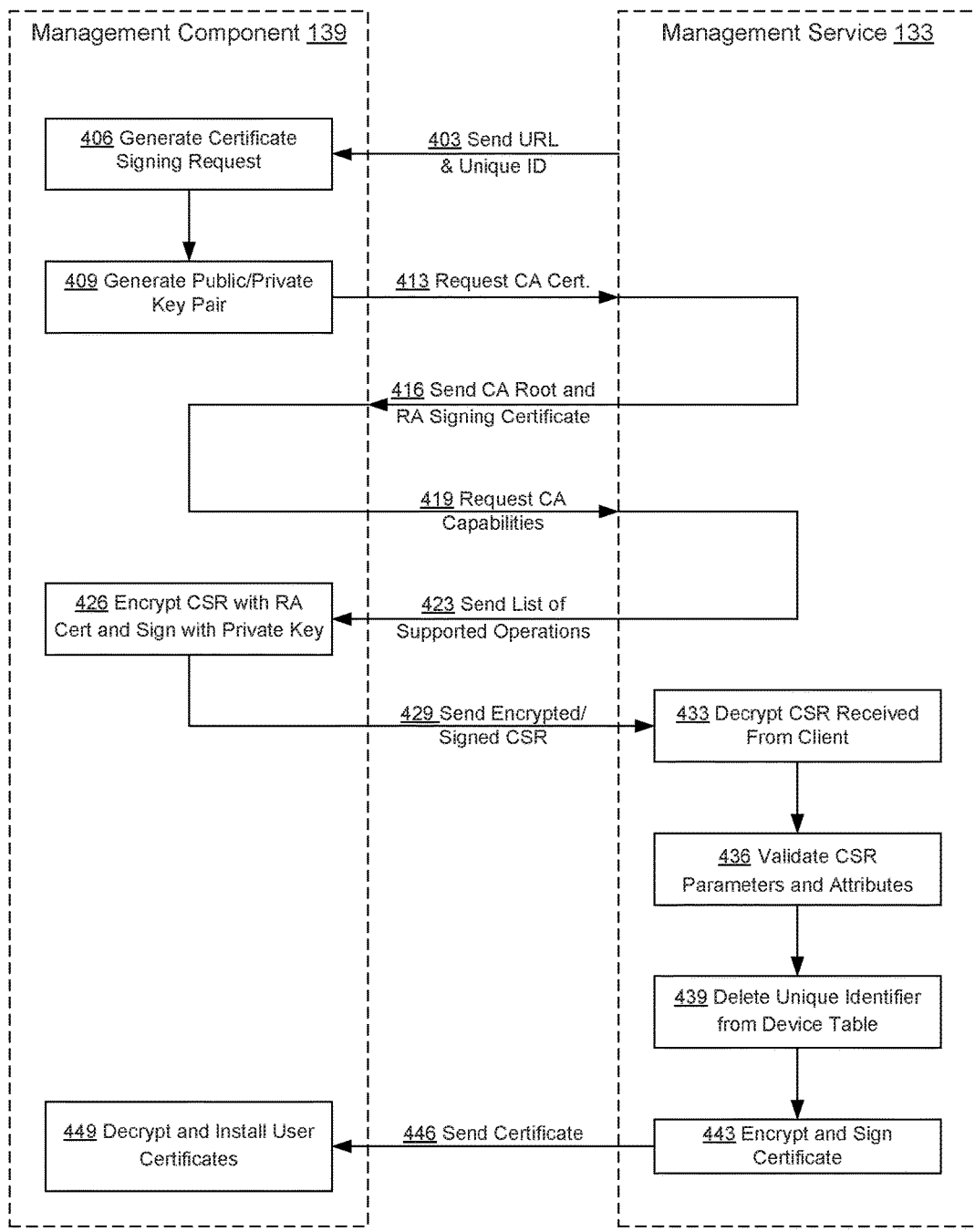
FIG. 4 is a sequence diagram illustrating one example of functionality according to various examples of the disclosure.

Referring next to FIG. 4, shown is a sequence diagram that provides an example illustration of the interaction between the management service 133 and the management component 139 as outlined previously in FIG. 2 and FIG. 3. As illustrated, each step previously described in FIG. 2 and FIG. 3 is shown in relation to the other steps to provide an example of the communication that occurs between the management service 133 and the management component 139.

To begin at step 403, the management service 133 can send a URL and a unique device identifier 149 to the management component 139. The URL may specify an address at which the management component 139 can request one or more user certificates 123. The URL may also indicate additional fields where specific information, such as the unique device identifier 149, can be included in any request made by the management component 139.

Proceeding next to step 406, the management component 139 can generate a CSR. The CSR can include a one-time password selected from a one-time password list 126 and include a unique device identifier 149 previously provided by the management service 133. However, in some instances, the one-time password and the unique device identifier 149 may be provided separately from the CSR.

Moving on to step 409, the management component 139 can generate a public/private key-pair 146. Generating a public/private key pair 146 specific for requesting a user certificate 123 can provide forward secrecy for similar transactions. Even if the public/private key pair 146 used to retrieve the user certificate 123 is compromised or discovered, separate requests for user certificates 123 remain secure because of their use of separate public/private key pairs 146. However, in some instances, the public/private key pair 146 may be preexisting and used for multiple transactions.

Referring next to step 413, the management component 139 can request the CA root certificate 116 and the RA signing certificate 119. The CA root certificate can be requested so that the CSR can be encrypted with the public key specified in the CA root certificate. The RA signing certificate 119 can be requested so that user certificates 123 received from the management service 133 can be verified.

Proceeding next to step 416, the management service 133 can send the CA root certificate 116 and the RA signing certificate 119 to the client device 106. The certificates can be sent in response to a request from the management component 139 for the certificates. The certificates can, in some examples, be sent via an encrypted channel, such as a connection secured using the transport layer security (TLS) protocol.

Moving on to step 419, the management component 139 can request the capabilities of the CA authority 136. The capabilities can be requested so that the appropriate cryptographic algorithms are used when sending the CSR to the management service 133.

Referring next to step 423, the management service 133 can send a list of operations supported by the certificate authority 136. The list of supported operations can include, for example, types of encryption algorithms (e.g. AES-128, AES-192, AES-256, TwoFish, 3DES, or other algorithms) and types of cryptographic hash algorithms (e.g. SHA-512, SHA-256, md5, or other algorithms).

Proceeding next to step 426, the management component 139 can encrypt the CSR with the public key specified in the CA root certificate 116 and sign the encrypted CSR with the private key in the public/private key pair 146 of the client device 106.

Moving on step 429, the management component 139 can send the encrypted CSR to the management service 133. The CSR can be sent to the URL previously received from the management service 133. In some instances, the unique device identifier 149 assigned to the client device 106 or a one-time password selected from the one-time password list 126 on the client device 106 are included in the URL.

Referring next to step 433, the management service 133 can decrypt a certificate signing request (CSR) received from the management component 139. The CSR can be encrypted by the management component 139 using the pubic key specified by the CA root certificate 116. The CSR can also be signed by the private key in the public/private key pair 146 of the client device 106.

Proceeding next to step 436, the management service 133 can validate the CSR. The management service 133 can, for example, determine whether the CSR was sent to the URL provided to the management component 139 previously at step 403. The management service 133 can also, for example, determine whether the unique device identifier 149 previously sent to the management component 139 was included with the CSR. If the CSR was sent to a different URL or was not accompanied by the unique device identifier 149, the management service 133 can determine that the CSR is invalid. In instances where the CSR included a one-time password for additional security, the management service 133 can query the device table 129 to determine if the one-time password is included in a one-time password list 126 linked to the unique device identifier 149. In addition, if the CSR was signed with a private other than the private key included in the public/private key pair 146 of the client device 106, the management service 133 can determine that the CSR is invalid.

Moving on to step 439, the management service 133 can delete the unique device identifier 149 from the device table 129. This removes the link between the unique device identifier 149 and the client device 106 as well as any corresponding user certificates 123 or one-time password lists 126. By deleting the unique device identifier 149, replay attacks where a third-party intercepts and resends the CSR are neutralized because the resent CSR would contain a unique device identifier 149 that is no longer in use.

Referring next to step 443, the management service 133 can encrypt and sign the user certificate 123. The user certificate 123 can be encrypted with the public key of the public/private key pair 146 of the client device 106. The user certificate can also be signed with the signing key specified by the RA signing certificate 119.

Proceeding next to step 446, the management service 133 can send the encrypted and signed user certificate 123 to the management component 139. In some instances, the user certificate 123 can be sent over a secure channel, such as a connection secured with TLS. However, this is not required because the user certificate 123 was previously encrypted at step 426.

Moving on to step 449, the management component 139 can decrypt and install the user certificates 123 it receives from the management service 133. Execution of the process subsequently ends.

The flowcharts of FIGS. 2, 3, and 4 show an example of the functionality and operation of implementations of components described herein. The components described herein can be embodied in hardware, software, or a combination of hardware and software. If embodied in software, each element can represent a module of code or a portion of code that includes program instructions to implement the specified logical function(s). The program instructions can be embodied in the form of source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowcharts of FIGS. 2, 3, and 4 show a specific order of execution, it is understood that the order of execution can differ from that which is shown. The order of execution of two or more elements can be switched relative to the order shown. Also, two or more elements shown in succession can be executed concurrently or with partial concurrence. Further, in some examples, one or more of the elements shown in the flowcharts can be skipped or omitted. In addition, any number of counters, state variables, warning semaphores, or messages might be added to the logical flow described herein, for purposes of enhanced utility, accounting, performance measurement, or troubleshooting aid. It is understood that all such variations are within the scope of the present disclosure.

The computers within the computing environment 103, the client device 106, or other components described herein can each include at least one processing circuit. Such a processing circuit can include one or more processors and one or more storage devices that are coupled to a local interface. The local interface can include a data bus with an accompanying address/control bus or any other suitable bus structure. The one or more storage devices for a processing circuit can store data or components that are executable by the one or processors of the processing circuit. Also, a data store, such as the data store 113 and the client data store 143, can be stored in the one or more storage devices.

The management service 133, the certificate authority 136, the management component 139, and other components described herein can be embodied in the form of hardware, as software components that are executable by hardware, or as a combination of software and hardware. If embodied as hardware, the components described herein can be implemented as a circuit or state machine that employs any suitable hardware technology. Such hardware technology can include one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that includes software or program instructions can be embodied in any non-transitory computer-readable medium for use by or in connection with an instruction execution system such as a processor in a computer system or other system. Such a computer-readable medium can contain, store, or maintain the software or program instructions for use by or in connection with the instruction execution system.

The computer-readable medium can include physical media, such as, magnetic, optical, semiconductor, or other suitable media. Examples of a suitable computer-readable media include, but are not limited to, solid-state drives, magnetic drives, flash memory. Further, any logic or component described herein can be implemented and structured in a variety of ways. One or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All such modifications and variations are intended to be included herein within the scope of this disclosure.

Therefore, the following is claimed:

1. A system, comprising:
  a computing device comprising a processor and a memory; and an application stored in the memory of the computing device that, when executed by the processor of the computing device, causes the computing device to at least:
send a uniform resource locator (URL) and a one-time password to a client device, wherein the URL represents an address from which the client device can request a user certificate with the one-time password and the URL comprises a unique identifier for the client device;
send a certificate for a registration authority to the client device, wherein the certificate comprises a first public key and a first private key;
decrypt a certificate signing request (CSR) received from the client device at the URL, wherein the CSR is encrypted with the first public key;
validate the CSR based at least in part on the URL and the one-time password sent to the client device;
encrypt the user certificate with a second public key provided by the client device;
sign the user certificate with the first private key;
send the user certificate to the client device; and
delete the unique identifier from the memory of the computing device.

2. The system of claim 1, wherein the application, when executed by the processor of the computing device, further causes the computing device to at least request the user certificate from a certificate authority.

3. The system of claim 1, wherein validation of the CSR is further based at least in part on whether the unique identifier is included in the URL at which the CSR is received.

4. The system of claim 1, wherein the application, when executed by the processor of the computing device, further causes the computing device to at least send a list of supported operations to the client device.

5. A method, comprising:
sending a uniform resource locator (URL) and a one-time password to a client device, wherein the URL represents an address from which the client device can request a user certificate with the one-time password and the URL comprises a unique identifier for the client device;
sending a certificate for a registration authority to the client device, wherein the certificate comprises a first public key and a first private key;
decrypting a certificate signing request (CSR) received from the client device at the URL, wherein the CSR is encrypted with the first public key;
validating the CSR based at least in part on the URL and the one-time password sent to the client device;
encrypting the user certificate with a second public key provided by the client device;
signing the user certificate with the first private key;
sending the user certificate to the client device; and
deleting the unique identifier from a memory of the computing device.

6. The method of claim 5, further comprising requesting the user certificate from a certificate authority.

7. The method of claim 5, wherein validating the CSR is further based at least in part on whether the unique identifier is included in the URL at which the CSR is received.

8. The method of claim 5, further comprising sending a list of supported operations to the client device.

9. A non-transitory computer-readable medium storing a plurality of computer instructions executable by a computing device, the plurality of computer instructions being configured to cause the computing device to at least:
send a uniform resource locator (URL) and a one-time password to a client device, wherein the URL represents an address from which the client device can request a user certificate with the one-time password and the URL comprises a unique identifier for the client device;
send a certificate for a registration authority to the client device, wherein the certificate comprises a first public key and a first private key;
decrypt a certificate signing request (CSR) received from the client device at the URL, wherein the CSR is encrypted with the first public key;
validate the CSR based at least in part on the URL and the one-time password sent to the client device;
encrypt the user certificate with a second public key provided by the client device;
sign the user certificate with the first private key;
send the user certificate to the client device; and
delete the unique identifier from the memory of the computing device.

10. The non-transitory computer-readable medium of claim 9, wherein the plurality of computer instructions are further configured to cause the computing device to at least request the user certificate from a certificate authority.

11. The non-transitory computer-readable medium of claim 9, wherein validation of the CSR is further based at least in part on whether the unique identifier is included in the URL at which the CSR is received.

12. The non-transitory computer-readable medium of claim 9, wherein the plurality of computer instructions are further configured to cause the computing device to at least send a list of supported operations to the client device.

13. The non-transitory computer-readable medium of claim 12, wherein the list of supported operations specifies a type of encryption algorithm.

14. The non-transitory computer-readable medium of claim 12, wherein the list of supported operations specifies a type of cryptographic hash algorithm.

15. The method of claim 8, wherein the list of supported operations specifies a type of encryption algorithm.

16. The method of claim 8, wherein the list of supported operations specifies a type of cryptographic hash algorithm.

17. The method of claim 5, wherein the user certificate is sent to the client device through a network connection protected by a version of the transport layer security (TLS) protocol.

18. The system of claim 4, wherein the list of supported operations specifies a type of encryption algorithm.

19. The system of claim 4, wherein the list of supported operations specifies a type of cryptographic hash algorithm.

20. The system of claim 4, wherein the user certificate is sent to the client device through a network connection protected by a version of the transport layer security (TLS) protocol.

* * * * *